United States Patent [19]
Pettersen et al.

[11] Patent Number: 5,973,788
[45] Date of Patent: Oct. 26, 1999

[54] SYSTEM FOR POINT-BY-POINT MEASURING OF SPATIAL COORDINATES

[75] Inventors: Alf D. Pettersen, Gjettum; Øyvind Røtvold, Hvalstad, both of Norway

[73] Assignee: Metronor ASA, Nesbru, Norway

[21] Appl. No.: 09/051,391

[22] PCT Filed: Oct. 10, 1996

[86] PCT No.: PCT/NO96/00237

§ 371 Date: Apr. 10, 1998

§ 102(e) Date: Apr. 10, 1998

[87] PCT Pub. No.: WO97/14015

PCT Pub. Date: Apr. 17, 1997

[30] Foreign Application Priority Data

Oct. 12, 1995 [NO] Norway ........................... 954056

[51] Int. Cl.⁶ .......................................... G01B 11/03
[52] U.S. Cl. .......................................... 356/375
[58] Field of Search ........................... 356/375, 376

[56] References Cited

U.S. PATENT DOCUMENTS

| | | |
|---|---|---|
| 5,305,091 | 4/1994 | Gelbart et al. |
| 5,440,392 | 8/1995 | Pettersen et al. ............ 356/375 |
| 5,729,475 | 3/1998 | Romanik ..................... 356/375 |

FOREIGN PATENT DOCUMENTS

| | | |
|---|---|---|
| 164946 | 10/1989 | Norway . |
| 165046 | 9/1990 | Norway . |
| 169799 | 4/1992 | Norway . |
| 89/09922 | 10/1989 | WIPO . |
| 91/16598 | 10/1991 | WIPO . |
| 93/07443 | 4/1993 | WIPO . |
| 94/28375 | 12/1994 | WIPO . |

*Primary Examiner*—Richard A. Rosenberger
*Attorney, Agent, or Firm*—IP Group of Pillsbury Madison & Sutro LLP

[57] ABSTRACT

A system for point-by-point measurement of spatial coordinates comprising: one or more opto-electronic cameras (7, 8) arranged for measuring spatial direction to point-shaped light sources; one or more rangefinders (11) for measuring distance and optionally direction to light-reflecting targets (19, 28); a touch tool (18) having a minimum of three point-shaped light giving means (21–25) in known local coordinates relative to a local tool-fixed coordinate system, one or more light-reflecting points or targets (28) for the laser rangefinder, and having a contact point (30) in known position relative to said local coordinate system; and data processor (2) designed to compute the spatial position and orientation of said touch tool (18) relative to said camera (7, 8) and rangefinder (11) on the basis of knowledge of the position of said light giving means (21–25) relative to the tool's contact point (30), the measured directions from the cameras (7, 8) to the individual light giving means (21–25), and measured distance from the laser rangefinder (11) to the light-reflecting point/target (28), so that the position of the tool (18) is referred to said contact point (30).

16 Claims, 8 Drawing Sheets

SYSTEM FOR POINT-BY-POINT MEASURING OF SPATIAL COORDINATES

This application is the national phase of international application PCT/NO96/00237, filed Oct. 10, 1996 which designated the U.S.

FIELD OF THE INVENTION

The present application relates to a system for point-by-point measuring of spatial coordinates.

BACKGROUND

Industrial geometric measuring is carried out today using a number of different methods. The most used optical methods are:

use of theodolites;
photogrammetry, i.e., camera-based measuring where the cameras conventionally are based on photographic film, or more recently, are based on electronic sensors;
use of laser rangefinders, where these may be based on the modulation of light and the detection of the phase of the returned beam, or on laser interferometry.

Modern photogrammetry systems, also known as videogrammetry systems, are based on video camera techniques. These register the position of points in the form of active light sources, reflecting points or characteristics of the object to be measured (e.g., holes). The points may be registered simultaneously by two or more cameras, or they can be imaged sequentially from a number of different camera positions. The spatial position of the points is calculated using mathematical methods which include the automatic determination of the position and orientation of the cameras for each individual image, and also correction for the cameras' lens errors and other factors which produce a non-ideal image. The cameras may also be pre-calibrated, i.e., correction of the image points is based on a calibration table or other mathematical correction.

Modern photogrammetry systems are marketed by the Norwegian company Metronor AS, the Swiss company Imetric SA and the US company GSI (Geodetic Services Inc.) Metronor's system is described in Norwegian Patents Nos. 164 946, 165 046, 169 799, 174 025, and also Norwegian Patent Application No. 931873.

Metronor's system is based on pre-calibrated cameras. The system is optimized in order to determine the position of active light sources. A measuring tool known as a light pen is used to mark the points that are to be measured. The light pen has a minimum of three light sources in known positions relative to its contact point. The coordinates of the contact point can be determined by simultaneously taking the image of the light sources.

Imetric and GSI offer systems where the cameras are not pre-calibrated, but are calibrated for each individual measuring operation. The cameras register the position of retroreflector targets. These are illuminated by flash lamps mounted on the cameras. The companies have also developed touch tools similar to Metronor's light pen, where the active light sources are replaced by retroreflector targets.

The photogrammetry systems determine directions in space through imaging (projection). The accuracy depends on the quality of the camera, the nature of the points to be measured, and in particular on the geometrical factors. Geometrical factors which influence accuracy are position, density and distribution of measuring points, the number of cameras or images, and position and orientation of the cameras, and also whether the cameras' lens errors are pre-determined.

The chief disadvantage of photogrammetry systems is that a measuring point must be registrable by two cameras simultaneously or in sequence by locating a camera in at least two different positions.

Laser rangefinders based on interferometry are internationally known under the product name "Laser tracker". A laser tracker consists of a laser, a mirror system for controlling the laser, a reflector unit, distance and direction sensors, and a computer. The reflector unit, also known as a "corner cube" or prism reflector, reflects light back parallel to the emitted beam. The laser beam is steered so that it always strikes the reflector unit. This is accomplished in that the laser tracker contains a sensor which detects the striking point on the reflector unit. In general, a laser tracker registers both direction and distance, and hence three-dimensional coordinates of the measuring point. The distance is determined by interferometry. The direction is determined by registering the orientation of the mirrors. The distance measurement exhibits high accuracy, whereas the direction is often determined with less precision.

Laser trackers have major disadvantages:

It is difficult to steer the laser beam so that it always strikes the reflector unit. It is particularly difficult to find the beam again if it is "lost".

Laser trackers based on interferometry are in general relative, i.e., they measure difference in distance to a reference point by counting interference rings. If the beam is broken, control of the number of interference rings is lost, and the process must be started again from the reference point.

It is only the position of the reflector unit that is determined. The orientation of the reflector unit remains unknown. In order to be able to measure a selected point on an object directly, the reflector unit must be provided with a contact point at a known distance from the centre thereof. The point must be measured repeatedly whilst the reflector unit is moved around the contact point when this is held still.

Accurate determination of direction requires complex and very precise mechanical solutions, and also compensation for variations in temperature and mechanical operation.

There is dependence upon clear line-of-sight between laser tracker and measuring point.

Leica and Chesapeake Lasers are among the companies producing laser trackers.

Other laser rangefinders are based on the modulation of emitted laser light, and the detection of the phase of the detected light. Fine resolution requires a high modulation frequency to be used. In order to avoid ambiguity when the reflecting point is moved more than one modulation period, several modulation frequencies are used, and the total phase gives the absolute distance. Thus, an absolute rangefinder is obtained.

Since a pure rangefinder only provides information related to the one-dimensional distance to the measuring point, several rangefinders must be combined in order to compute spatial position. Three distances are necessary in order to determine three-dimensional coordinates for one point. Examples of such systems are described in U.S. Pat. No. 5,305,091.

Routine inspection of mechanical structures is often based on measuring a number of fixed control points. This applies, for example, to production fixtures in the aviation industry. The control points may be made in the form of holes of a fixed diameter. Targets for photogrammetry, theodolite measuring or laser trackers are produced for these holes. Routine inspection of the structures involves the regular measurement of these points.

In the present invention it is proposed to combine photogrammetry technology with laser distance and angle measuring, so that the advantages of both methods are used to the full, whilst their disadvantages are avoided. The following is thus achieved:

high accuracy through the combination of accurate direction information from the camera and accurate distance information from the laser rangefinder;

access to hidden points, and also geometric entities such as holes or cylinders so that these can be measured;

simplified design of the laser, in that the camera registers the direction to the reflector unit.

BRIEF DESCRIPTION OF THE DRAWINGS

The characterizing features of the invention will be made apparent in the patent claims below, and also in the following description of the non-limiting examples of the invention with reference to the attached drawings.

SUMMARY OF THE INVENTION

In the following description, and the subsequent patent claims, the term "reflecting point" is used with regard to units located to provide unambiguous registration by camera or laser rangefinder, in that the emitted light is reflected back to the sensor units. This comprises so-called retroreflective targets or reflective tape produced for use with photogrammetry systems or theodolites, or so-called "corner cubes" used with laser rangefinders.

In the following description, and the subsequent patent claims, the term "light giving means" is used as a collective term comprising active light sources (emitters) such as light emitting diodes or laser diodes, and reflecting points.

The term "laser rangefinder" is used as a collective term for all types of systems based on a laser beam which is directed in towards a specific point in order to compute the distance to that point. This includes both laser interferometry techniques (laser trackers) and systems based on measuring the time difference from when a light pulse is emitted to when the reflected pulse is registered, or phase modulation/measurement or combinations of these techniques. The function of the system will depend upon whether the laser rangefinder is absolute or relative. In a relative rangefinder (for example, based on interferometric principles) the laser beam must follow the reflecting point continuously without interruption. If the laser rangefinder also contains precise direction determination this will be used in the computation of position.

DETAILED DESCRIPTION OF PRESENTLY PREFERRED EXEMPLARY EMBODIMENTS

Figure 1:
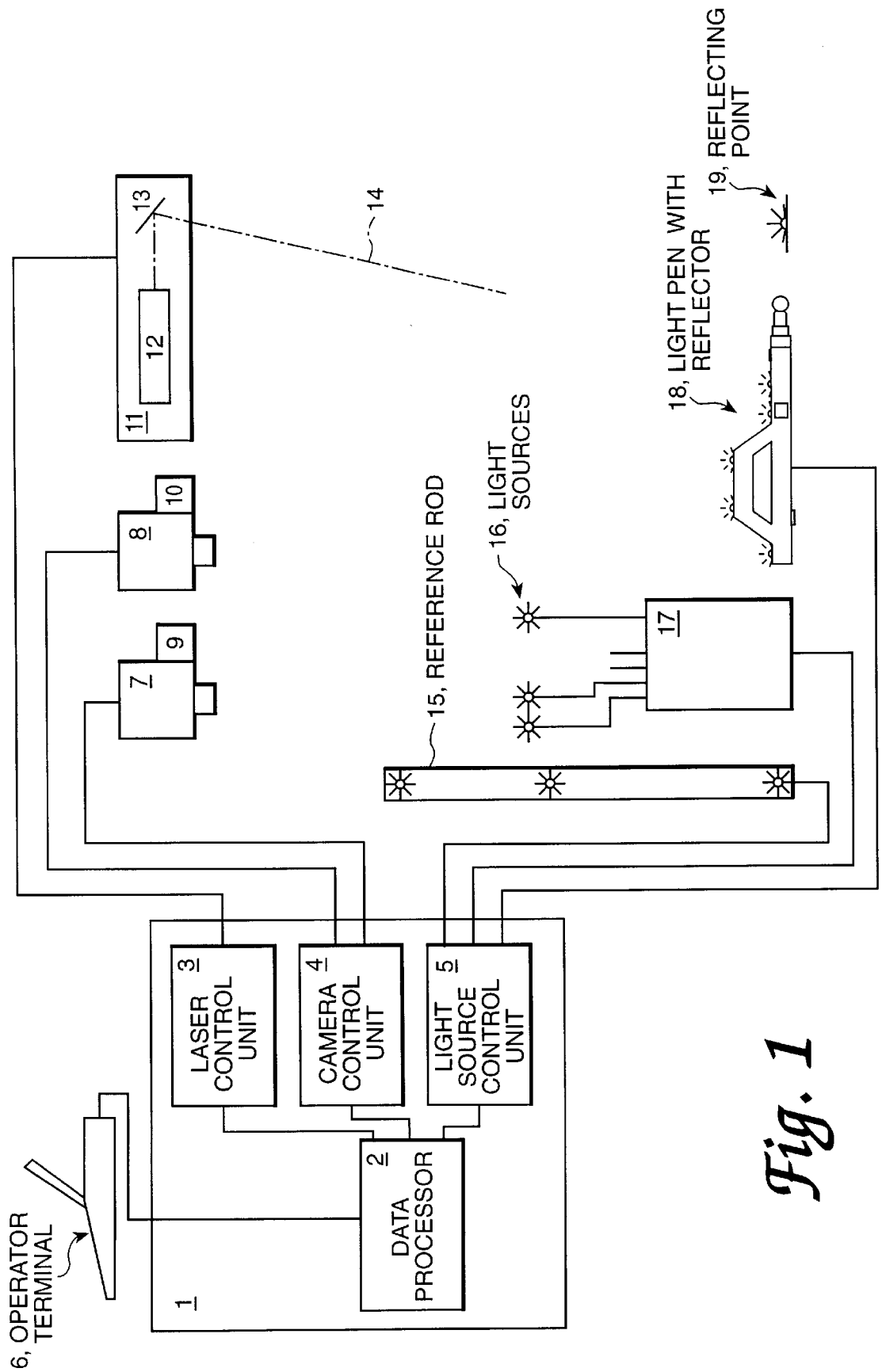
FIG. 1 illustrates components which are included in a system based on a combination of camera and laser rangefinder.

The complete system solution is shown in FIG. 1 in the form of a block diagram. The system contains a system console 1 containing a data processor 2, a laser rangefinder control unit 3, a camera control unit 4 and a light source control unit 5. The system is operated from an operator terminal 6. The system contains one or more cameras 7, 8. These may be equipped with flash lamps 9, 10. Furthermore, the system contains a laser rangefinder unit 11 consisting of a laser and sensor unit 12 and mirror 13 for steering the laser beam 14 in the right direction. The laser rangefinder will contain two mirrors mounted at right angles to one another, to enable the laser beam to be directed in towards any point in space. In the figure only one of these mirrors 13 is outlined. The system may contain various tools for position determination: reference rod 15 for calibration, light sources 16 connected to a connection box 17 for marking reference points, touch tool 18, also known as a light pen, and reflecting point 19.

Figure 2A:
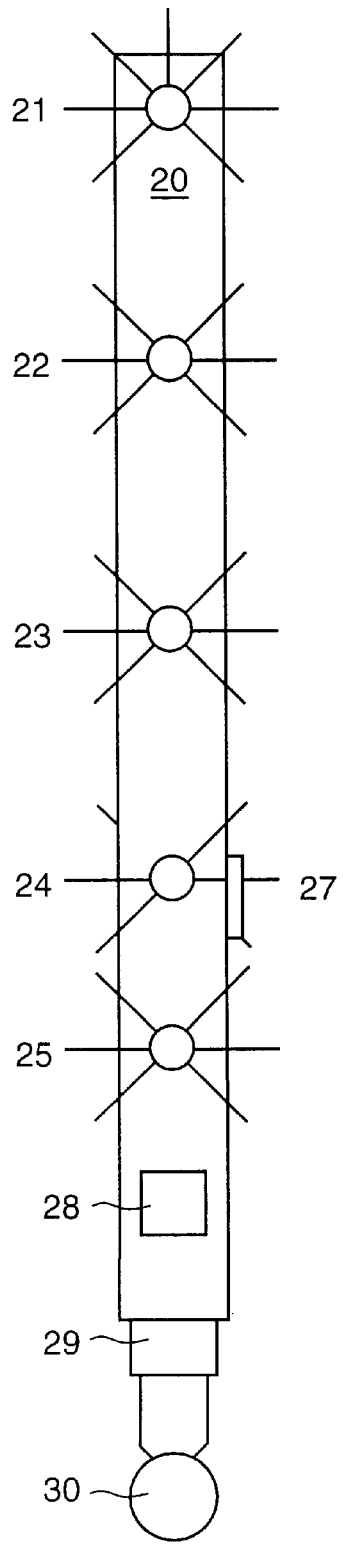
FIGS. 2a and 2b illustrate a touch tool having five light sources and a reflecting point for the laser rangefinder.
Figure 2B:
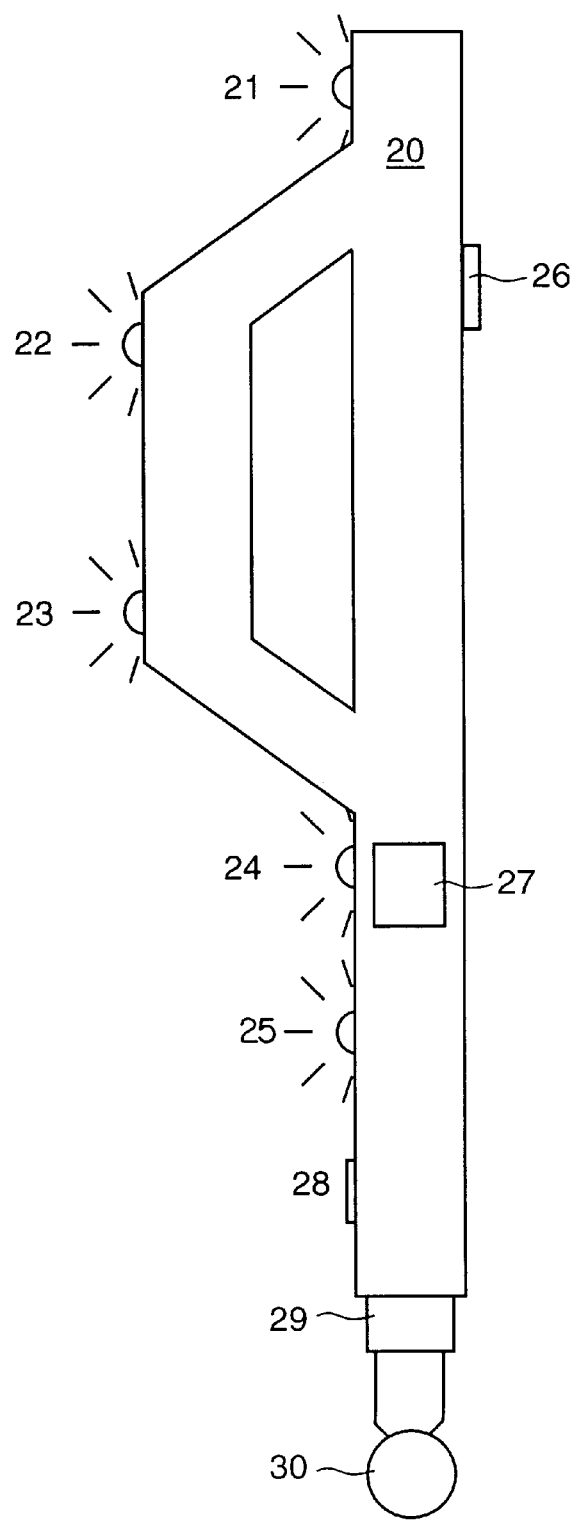

FIGS. 2a and 2b show the touch tool 18 from in front (FIG. 2a) and seen from the side (FIG. 2b). It consists of a body 20 which is preferably produced in a temperature-resistant material in order to avoid temperature expansion, a plurality of light sources 21–25, activation switches 26, 27, reflecting point 28, tool adapter 29 and contact point 30. The minimum number of light sources is three. These are mounted in known coordinates relative to a local tool-fixed coordinate system. The contact point 30 (reference point) can be in the form of a sphere or a tip. By virtue of the fact that the position of this point is also known relative to the local coordinate system, the position of the touch tool can be related to this point. In a special case there may be two light sources, if the contact point 30 lies on a straight line through both light sources. The touch tool will primarily function as described in Swedish Patent No. 456 454, and will be capable of having replaceable tools as described in Norwegian Patent No. 169 799. The design of the reflecting point will depend upon the type of laser rangefinder that is used. If the rangefinder requires the use of retrorflectors, e.g., corner cubes, this could be fixedly mounted, or could be a detachable unit which is fined in an accompanying fixing mechanism on the touch tool.

Figure 3:
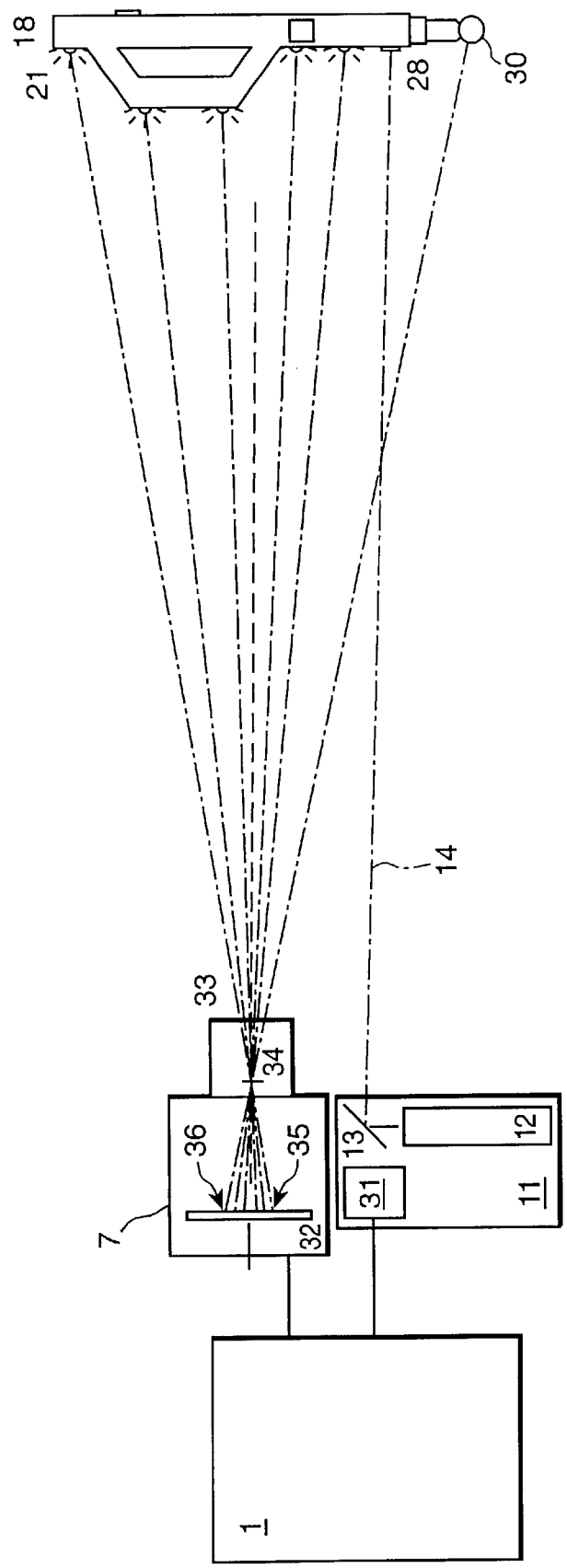
FIG. 3 illustrates a system based on one camera in combination with a laser rangefinder and touch tool.

FIG. 3 shows the measuring principle when using one camera 7 in combination with a laser rangefinder 11.

The camera consists of a lens unit 33, and a two-dimensional array (matrix) 32 of photosensitive elements. The lens unit is an objective having standard spherical optics, having a focal length substantially dictated by the required visual field. The lens's optional anti-reflex coating or optical filter must be adapted to the spectral distribution in the light sources used. The photosensitive elements are, for instance, of the CCD (Charge Coupled Device) or CID (Charge Injected Device) type. The requirements with respect to high accuracy mean that matrices having maximum resolution will normally be used. If the speed of the system is of primary importance, matrices having fewer elements will be used. High accuracy can be ensured by using accurate calibration of the angle measuring device. This may for example be done as described in Norwegian Patent 165046. The camera 7 registers a light source 21 in the form of the position of its image 35 on the sensor matrix 32.

The operator positions the touch tool 18 so that the contact point 30 touches the actual point to be registered. The camera 7 registers the image of all light sources 21–25, and on the basis of the image the position and orientation of the touch tool is computed as described in Norwegian Patent No. 174 025. At the same time the rangefinder 11 registers the distance to the reflecting point 28.

The laser beam 14 is directed in towards the reflecting point 28 by means of mirror 13 which is controlled by motor 31. A single mirror 13 is indicated in the figure. In order to be able to direct the beam 14 in towards any point in space, there will be two mirrors. One of them controls the horizontal adjustment of the beam, and the other its vertical direction. Laser and sensor unit 12 registers the distance to the reflecting point 28.

Information with regard to the direction from the laser rangefinder to the reflecting point is required in order to adjust the laser beam. This can be obtained using one of the following methods:

Approximate values for position and orientation of the touch tool are computed on the basis of the camera image alone and this information is transferred to the laser rangefinder control unit 3.

The laser rangefinder may contain a separate sensor 12 in order to register where the laser beam 14 strikes the reflector unit. This can be used for controlling the mirrors 13.

The registered image from the camera 7 is combined with the registered distance from the laser rangefinder 11 to the point 28, so that highest possible precision is obtained in the computed position of the contact point 30. If the laser rangefinder also registers the direction of the laser beam (as in commercially available laser trackers), the registered direction is also used in the computation. The computation is based on compensation of errors in the observations, so that all the observations are used and given importance on the basis of their accuracy. All computations are performed by the data processor 2.

The computation of the position and orientation of the touch tool 18 is based on the fact that the geometry, i.e., the relative position of the light sources 21–25, the reflecting point 28 and the contact point 30, is known. The contact point 30 has a theoretical image point 36 on the sensor matrix 32.

The computed position is initially given relative to position and orientation of camera and rangefinder. By measuring a minimum of three points in known positions relative to a local coordinate system, all subsequent points can be given in this coordinate system.

An essential characteristic of the system is its ability to measure points which are not visible from the sensor system. In general, measuring systems based on cameras or laser distance measuring have a weakness in that points which are not visible cannot be measured. When using the touch tool 18 a clear line of sight from the camera to the light sources 21–25 and from the laser rangefinder 11 to the reflecting point 28 is required. However, a clear line of sight to the contact point 30 is not required. The location of the contact point 30 relative to the other parts of the touch tool can be adapted to the geometry of the object which is to be measured.

The system solution can be optimized in various ways, for instance in order to increase its total measuring accuracy or to reduce the complexity of the system. In general, higher accuracy is achieved by increasing the number of cameras or number of laser rangefinders in the system. The individual laser rangefinders can follow the same reflecting point 28, or the touch tool may be equipped with a plurality of reflecting points corresponding to the number of rangefinders in the system.

If the laser rangefinder has a built-in sensor and control systems to direct the laser beam 14 in towards the reflecting point 28, the camera and laser rangefinder units can work independent of one another with the exception of the final coordinate computation which takes into account the observations from both units.

Figure 4:
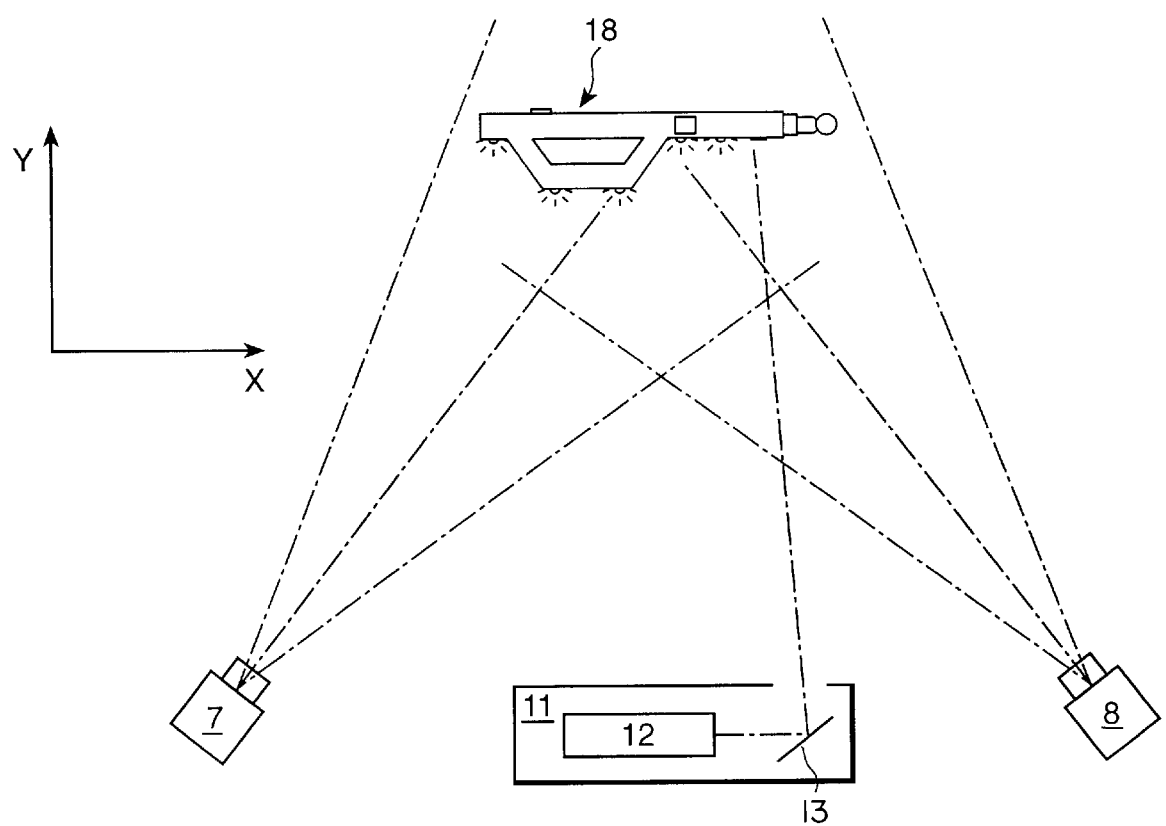
FIG. 4 illustrates a system based on two cameras in combination with a laser rangefinder and a touch tool.

FIG. 4 illustrates a system based on two cameras 7, 8 in combination with one laser rangefinder 11 and touch tool 18. Greater precision of measurement is achieved with this system configuration, as the touch tool 18 is observed from two different directions. The laser rangefinder 11 may be connected to one of the cameras 7, 8, or stand alone. Its position and orientation must be known relative to the cameras 7, 8, which can be done by the calibration procedure which is described below.

An alternative system solution may consist of one camera 7 and two laser rangefinders 11. If the touch tool has two reflecting points 28 mounted thereon, for example, at each end of the touch tool, the two laser rangefinders can each follow their respective reflecting point.

A considerable rationalization gain is achieved if the active light sources are replaced with reflecting points. These can be illuminated by a flash lamp 9 which is mounted on the camera 7, thereby giving a sharp image on the camera's sensor matrix 32. One or more of these reflecting points can be used for registering distance.

If the laser rangefinder is of an absolute type, one rangefinder can register distance to several reflecting points. This takes place in that the laser beam is directed sequentially in towards each individual point.

Figure 5:
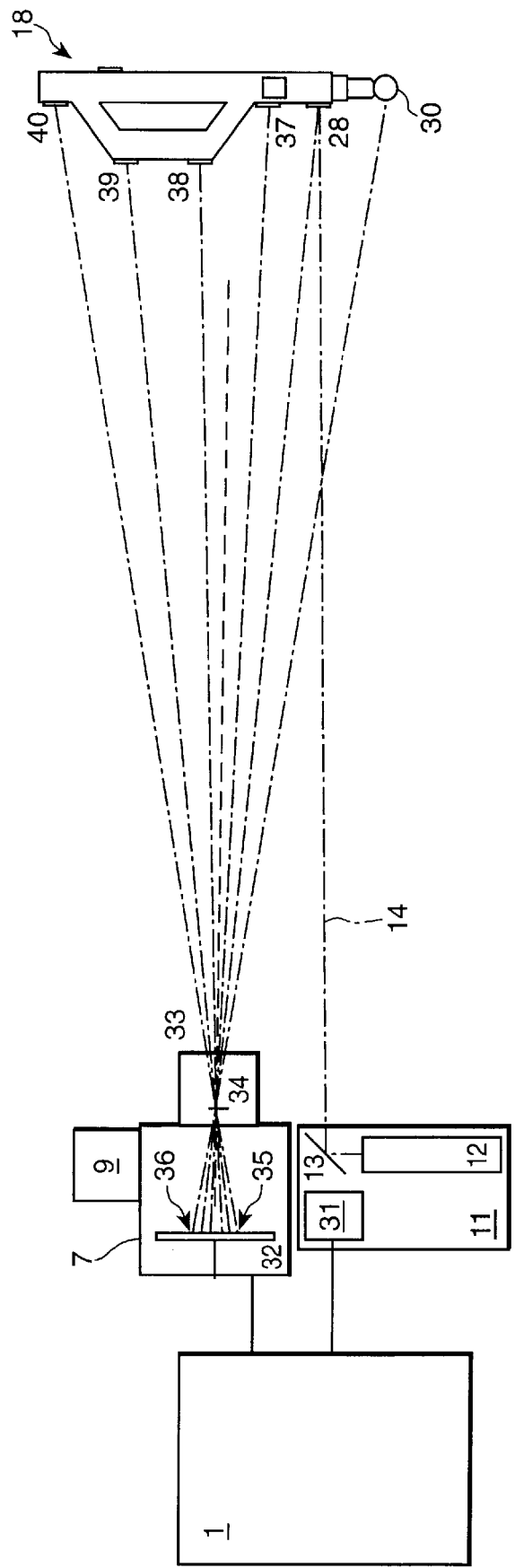
FIG. 5 illustrates a system based on one camera in combination with a laser rangefinder where the touch tool has reflecting points for registration of both camera and laser rangefinder.

FIG. 5 illustrates a system based on one camera in combination with a laser rangefinder, where the touch tool has reflecting points 28, 37–40 for registration by both camera and laser rangefinder. A measurement consists of the camera's flash lamp 9 illuminating all reflecting points and the camera 7 registering their position. The laser rangefinder 11 registers the distance to one reflecting point 28 or all reflecting points. Optionally several rangefinders can be used. Position and orientation of the touch tool is computed in the data processor 2.

Figure 6:
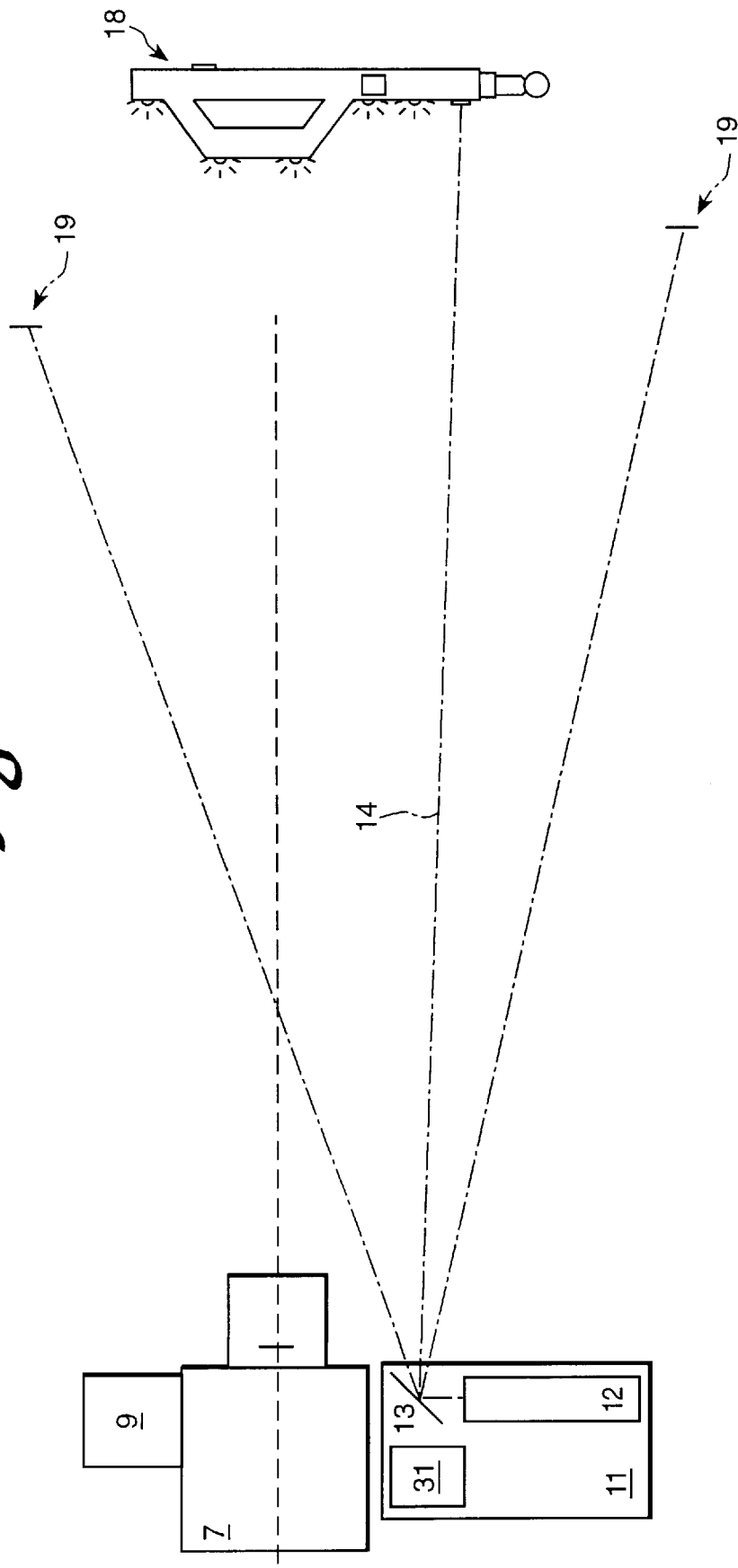
FIG. 6 illustrates an arrangement where one camera in combination with a laser rangefinder is used for measuring the position of a touch tool having reflecting points, and also isolated reflecting points. Both touch tool and isolated reflecting points are registered by both camera and laser rangefinder.

FIG. 6 shows how the system, in addition to determining the position of the touch tool 18, can also determine spatial position of isolated reflecting points 19. This allows a rapid measurement to be made of fixed control points in the structure, whilst other points can be measured with the aid of the touch tool 18. The procedure consists of the camera's flash lamp 9 illuminating all reflecting targets 19, and the camera thus registering the direction to these. On the basis of the registered directions the mirrors 13 in the laser rangefinder 11 are guided so that the distance to the reflecting points 19 is determined. Registration of the position of the touch tool 18 takes place in the same way as described above in relation to FIGS. 3 and 5.

Figure 7:
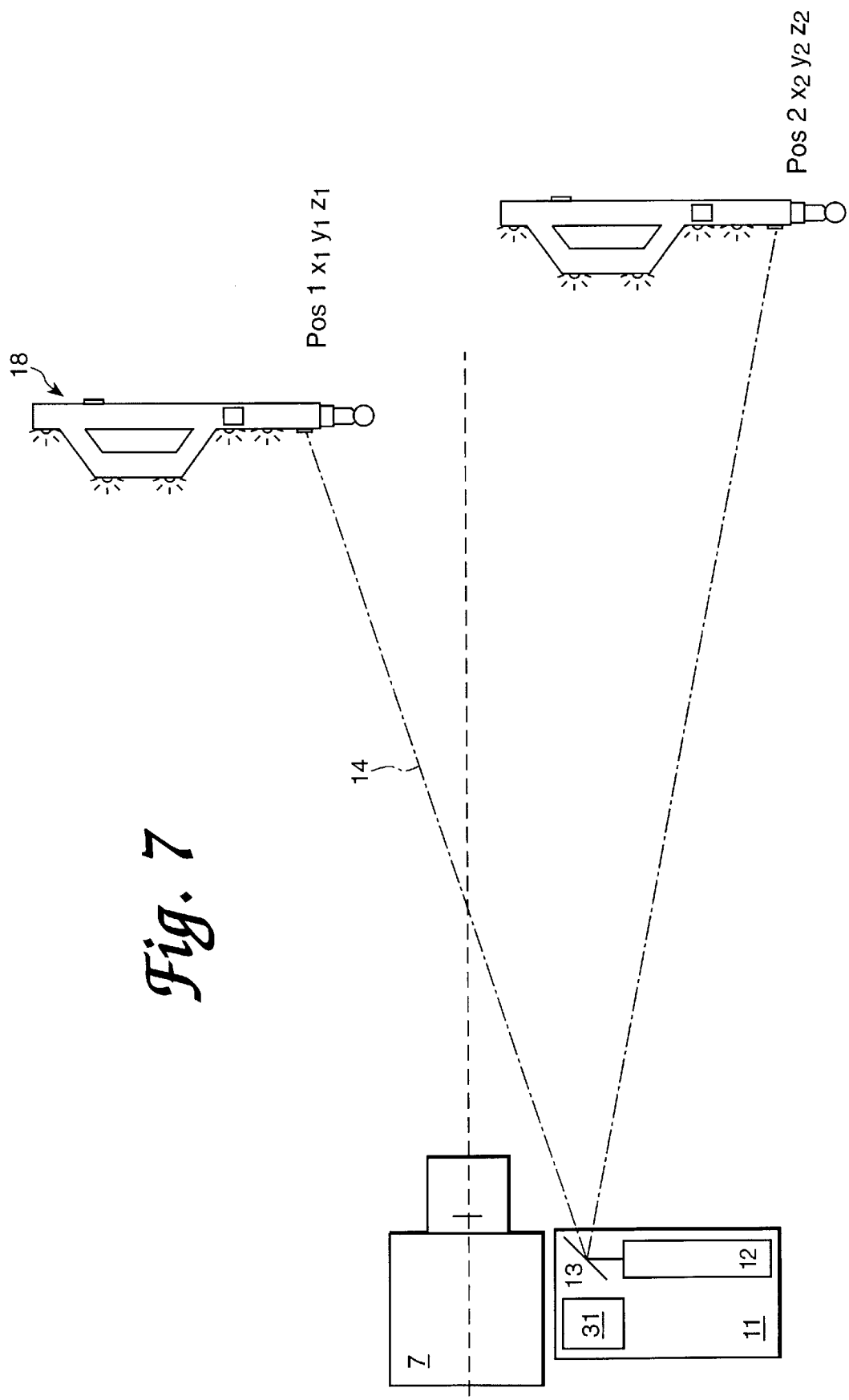
FIG. 7 illustrates a principle for calibration of the geometric relation between position and orientation of camera and laser distance measurement.

In order to be able to determine spatial position of the touch tool 18 and other reflecting points 19 by combining the observations of the camera 7 with the measured distances, it is necessary to know the relative position and orientation of laser rangefinder 11 and camera 7. FIG. 7 illustrates a principle for calibration of the geometric relation between position and orientation of camera 7 and laser rangefinder 11, this means to say to determine position and orientation of the laser rangefinder 11 relative to the camera 7.

The calibration method consists of the simultaneous determination of position and orientation of the touch tool 18 by the camera 7 and the distance from the laser rangefinder 11 to the reflecting point 28, and that this is done for a number of randomly selected points. If the system consists of only one camera 7 and one rangefinder 11, additional information in the form of known mutual coordinates or known distance between some of the measured points is necessary. If camera 7 and laser rangefinder 11 are permanently integrated, calibration can be a one-off procedure which is performed when the unit is produced.

When steering the laser rangefinder 11 on the basis of registered directions from the camera 7, it must be taken into account that the directions are not defined relative to the same starting point. This can be resolved using the following techniques:

By there being nominal spatial coordinates for a reflecting point 19. Measured direction from the camera 7 is used to correct the direction of the laser beam 14 so that it strikes the point 19.

By combining a camera 7 and touch tool 18, the spatial position of the reflecting point 28 is determined. If the position and orientation of the laser rangefinder relative to the camera are known the direction of the laser beam 14 is determined uniquely.

By using two cameras 7, 8 the spatial position of a reflecting point 19 is determined. If the position and orientation of the laser rangefinder relative to the camera is known, the position of the laser beam 14 is determined uniquely.

If only the direction from one camera 7 to a reflection point 19 is known, the laser rangefinder 11 control unit 3 must contain search algorithms which make it possible to correct for the distance between the camera 7 and the laser rangefinder.

Figure 8:
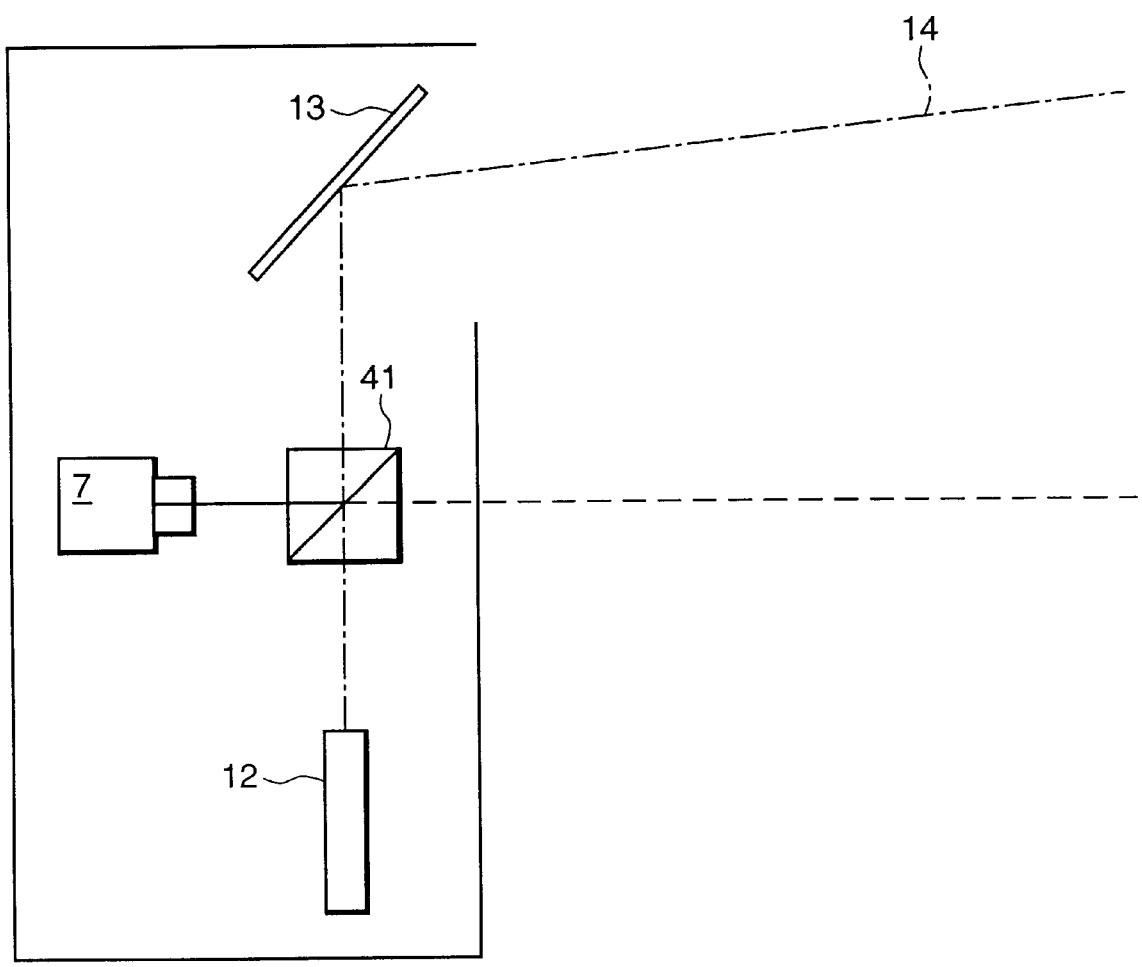
FIG. 8 illustrates an integrated camera and laser rangefinder system.

By integrating camera and laser rangefinder so that the center of rotation of the laser rangefinder's mirror 13 is on the optical axis of the camera as indicated in FIG. 8. The integration is based on an optical path redirecting means 41, commonly known as a beam splitter 41 placed in the laser beam 14. With the aid thereof, the camera 7 looks along the laser beam 14, and thus sees directly the deviation between beam direction 14 and target point 28. The visual field of the camera 7 will in this case be determined by the geometrical relation between camera 7, optical path redirecting means 41 and mirror 13. The dimension of optical path redirecting means 41 and mirror 13, plus the distance therebetween, will be limiting. The visual field of the camera 7 will follow the adjustment of the mirror 13, so that the camera 7 will always see an area around the laser beam 14. The total registered direction from the sensor unit to the touch tool or reflecting point will be determined by the orientation of the mirror and the position of the image on the camera's 7 sensor.

The precision in position determination depends upon how accurately the camera and laser rangefinder can determine respectively direction and distance. The accuracy of the camera depends upon whether it is calibrated so as to be able to correct for lens and sensor error. Such calibration is well-known within photogrammetry technique. The cameras may be factory-calibrated, as described for example in Norwegian Patent No. 165 046, or calibrated in a measuring operation. Such calibration requires either the measuring of a plurality of points from different camera positions, or the photographing of a greater number of points in known mutual position from a minimum of one camera position. The system and the methods described above are not dependent upon the calibration of the camera, if any.

The present invention provides the possibility of determining spatial coordinates for selected points with great precision and using simple measuring technique. The weaknesses which encumber today's laser rangefinders are avoided, in particular:

the need not to break the laser beam;

the difficulty of steering the laser beam to a number of different reflecting points; and the limited possibilities of measuring points where there is no clear view between the laser rangefinder and the measuring point.

The measuring technique will be particularly well-suited for use in the automotive and aviation industries. The checking of production equipment for welding together car bodies is one example. High measurement accuracy and measurement rate are required, whilst the production lines are complex and obstruct the clear line-of-sight between measuring equipment and measuring point.

We claim:

1. A system for point-by-point measuring of spatial coordinates, comprising:

at least one opto-electronic camera arranged to measure spatial direction to light giving means:

touch tool having a minimum of three point-shaped light giving means at known local coordinates relative to a local tool-fixed coordinate system, and having a contact point at a known position relative to said local coordinate system;

a laser rangefinder being provided for measuring distance to light reflecting targets, said rangefinder having in operation a specific positional relationship to said at least one camera, the one or more light reflecting points/targets for said laser rangefinder being located on the touch tool, and a data processor constructed and programmed to compute the spatial position and orientation of said touch tool relative to said at least one camera and said rangefinder on the basis of the position of said light giving means relative to the tool's contact point, the measured directions from the cameras to the individual light giving means, and measured distance from the laser rangefinder to the light reflecting point/target, so that the position of the tool is related to said contact point.

2. A system as in claim 1, wherein the data processor is constructed and programmed, on the basis of said computation, to control the the direction of a laser beam from the laser rangefinder so that the beam strikes said reflecting point/targets for registration of the distance thereto.

3. A system as defined in claim 1, wherein the touch tool's light giving means comprises at least three light-reflecting targets, and in a minimum number of three; that at least one of the cameras has a flash lamp mounted thereon for illumination of the light-reflecting targets.

4. A system as defined in claim 1, wherein the system comprises only a single camera mechanically connected with said laser rangefinder.

5. A system as defined in claim 1, further comprising means for adjusting an illumination time and intensity for each of the touch tool's light giving means on the basis of a signal level which at any given time is registered by said at least one camera, so that an optimum signal/noise relation is obtained at all times.

6. A system as in claim 1, wherein the at least one camera and laser rangefinder are arranged to register direction and distance to isolated light reflecting targets; and the data processor is constructed and programmed to steer the rangefinder's laser beam on the basis of the directions to the targets as observed from the cameras.

7. A system as defined in claim 1, wherein the single camera and the single laser rangefinder are built as one unit, said unit further including a rotatable mirror and an optical path redirecting means, whereby the optical path of view of said camera and the optical path of the laser rangefinder laser beam are along a first common optical axis between the redirecting means and the mirror, and along a second common axis between the mirror and said targets.

8. A system as in claim 1 wherein said laser rangefinder also measures direction to said light reflecting targets.

9. A system for point-by-point-measuring of spatial coordinates, comprising:

at least one camera arranged to measure spatial direction to point-shaped light sources;

a touch tool having point-shaped light sources in known local coordinates relative to a local tool-fixed coordinate system, and having a contact point in known position relative to said local coordinate system;

a laser rangefinder for measuring distance to light reflecting targets, said rangefinder having in operation a specific positional relationship to said at least one camera, the light reflecting targets for said single laser rangefinder being located as light sources on the touch tool, and a data processor for computing a spatial position and orientation of said touch tool relative to said at least one camera and said laser rangefinder based on the position of said light sources relative to the tool's contact point, measured directions from the cameras to the individual light sources, and a measured distance from the laser rangefinder to the light reflecting point/target.

10. A system as in claim 9, wherein the data processor is designed, on the basis of said computation, to control the direction of the rangefinder's laser beam so that the beam strikes said reflecting points for registration of distances thereto.

11. A system as defined in claim 9, wherein the touch tool's light sources comprises light-reflecting targets, and at least one of the cameras has a flash lamp mounted thereon for illumination of the light-reflecting targets.

12. A system as defined in claim 9, wherein the system comprises only a single camera mechanically connected with said laser rangefinder.

13. A system as defined in claim 9, further comprising means for adjusting illumination time and intensity for each of the touch tool's light sources on the basis of a signal level which at any given time is registered by said at least one camera, so that an optimum signal/noise relation is obtained at all times.

14. A system as in claim 9, wherein the at least one camera and laser rangefinder are arranged to register direction and distance to isolated light reflecting targets; and the data processor is designed to steer the rangefinder's laser beam on the basis of the directions to the targets as observed from the cameras.

15. A system as defined in claim 9, wherein the single camera and the single laser rangefinder are built as a single unit, said unit further including a rotatable mirror and an optical path redirecting means, whereby the optical path of view of said camera and the optical path of the laser rangefinder laser beam are along a first common optical axis between the redirecting means and the mirror, and along a second common axis between the mirror and said targets.

16. A system as in claim 9 wherein said laser rangefinder also measures direction to said light reflecting targets.

* * * * *